United States Patent
Itano et al.

(10) Patent No.: US 12,480,029 B2
(45) Date of Patent: *Nov. 25, 2025

(54) COMPOSITION CONTAINING REFRIGERANT, USE OF SAME, REFRIGERATOR HAVING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP); Satoshi Tokuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 934 days.

This patent is subject to a terminal disclaimer.

(21) Appl. No.: 17/559,062

(22) Filed: Dec. 22, 2021

(65) Prior Publication Data

US 2022/0112418 A1    Apr. 14, 2022

Related U.S. Application Data

(63) Continuation of application No. PCT/JP2020/024166, filed on Jun. 19, 2020.

(30) Foreign Application Priority Data

Jun. 26, 2019 (JP) ................. 2019-118913

(51) Int. Cl.
    *C09K 5/04* (2006.01)

(52) U.S. Cl.
    CPC ........ *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
    CPC .......... C09K 5/04; C09K 5/041; C09K 5/044; C09K 5/045; C09K 2205/122; C09K 2205/126; C09K 2205/22; C09K 2205/40
    See application file for complete search history.

(56) References Cited

U.S. PATENT DOCUMENTS

| | | | | |
|---|---|---|---|---|
| 6,054,064 | A * | 4/2000 | D'Aubarede | ......... C09K 5/045 252/67 |
| 2011/0253927 | A1 | 10/2011 | Minor et al. | |
| 2017/0002245 | A1 | 1/2017 | Fukushima | |
| 2017/0058174 | A1* | 3/2017 | Fukushima | ............. C09K 5/045 |
| 2017/0146284 | A1* | 5/2017 | Matsunaga | ........... F25D 23/065 |
| 2018/0051198 | A1 | 2/2018 | Okamoto et al. | |

FOREIGN PATENT DOCUMENTS

| | | | |
|---|---|---|---|
| CN | 112437800 | 3/2021 | |
| EP | 3 985 079 | 4/2022 | |
| JP | 10-506131 | 6/1998 | |
| JP | 2015-229767 | 12/2015 | |
| JP | 2015229767 A * | 12/2015 | |
| WO | 2015/141678 | 9/2015 | |
| WO | 2015/147338 | 10/2015 | |
| WO | WO-2016104296 A1 * | 6/2016 | .............. C09K 5/04 |
| WO | 2016/182030 | 11/2016 | |
| WO | 2019/021726 | 1/2019 | |

OTHER PUBLICATIONS

Extended European Search Report issued Jun. 28, 2023 in corresponding European Patent Application No. 20831272.8.
International Preliminary Report on Patentability issued Dec. 28, 2021 in corresponding International (PCT) Application No. PCT/JP2020/024166.
International Search Report issued Sep. 8, 2020 in International (PCT) Application No. PCT/JP2020/024166.

* cited by examiner

*Primary Examiner* — Matthew R Diaz
(74) *Attorney, Agent, or Firm* — Wenderoth, Lind & Ponack, L.L.P.

(57) ABSTRACT

Provided is a novel low-GWP mixed refrigerant. A composition comprising a refrigerant, the refrigerant comprising 1,1-difluoroethylene (HFO-1132a) and difluoromethane (R32), wherein HFO-1132a is present in an amount of 26 to 40 mass % based on the total of HFO-1132a and R32, and R32 is present in an amount of 60 to 74 mass % based on the total of HFO-1132a and R32.

6 Claims, No Drawings

COMPOSITION CONTAINING REFRIGERANT, USE OF SAME, REFRIGERATOR HAVING SAME, AND METHOD FOR OPERATING SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: HFC-32 or R32) and pentafluoroethane ($C_2HF_5$: HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY

A composition comprising a refrigerant, the refrigerant comprising 1,1-difluoroethylene (HFO-1132a) and difluoromethane (R32), wherein HFO-1132a is present in an amount of 26 to 40 mass % based on the total of HFO-1132a and R32, and R32 is present in an amount of 60 to 74 mass % based on the total of HFO-1132a and R32.

Advantageous Effects

The refrigerant according to the present disclosure has a low GWP.

DESCRIPTION OF EMBODIMENTS

The present inventors conducted intensive study to solve the above problem, and consequently found that a composition comprising a refrigerant, the refrigerant comprising HFO-1132a in an amount of 26 to 40 mass % based on the total of HFO-1132a and R32, and R32 in an amount of 60 to 74 mass % based on the total of HFO-1132a and R32, has the above properties. The present inventors also found that a composition comprising a refrigerant, the refrigerant comprising HFO-1132a, HFO-1132(E), and R32, wherein HFO-1132a and HFO-1132(E) are present in a total amount of 26 to 40 mass % based on the total of HFO-1132a, HFO-1132(E), and R32, and R32 is present in an amount of 60 to 74 mass % based on the total of HFO-1132a, HFO-1132(E), and R32, has the above properties.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

1. Refrigerant 1.1 Refrigerant Component

Refrigerant 1 according to the present disclosure comprises HFO-1132a in an amount of 26 to 40 mass % based on the total of HFO-1132(E) and R32, and R32 in an amount of 60 to 74 mass % based on the total of HFO-1132(E) and R32. Refrigerant 1 according to the present disclosure has both a COP ratio and a refrigerating capacity ratio of 90% or more relative to those of R410A, and a GWP of 500 or less.

Refrigerant 2 according to the present disclosure comprises HFO-1132a, HFO-1132(E), and R32, wherein HFO-1132a and HFO-1132(E) are present in a total amount of 26 to 40 mass % based on the total of HFO-1132a, HFO-1132 (E), and R32, and R32 is present in an amount of 60 to 74 mass % based on the total of HFO-1132a, HFO-1132(E), and R32.

Refrigerant 2 according to the present disclosure has a COP ratio of 90% or more relative to that of R410A, a refrigerating capacity ratio of 115% or more relative to that of R410A, and a GWP of 500 or less.

Refrigerant 1 according to the present disclosure may further comprise other additional refrigerants in addition to HFO-1132a and R32 as long as the above properties and effects are not impaired. In this respect, the refrigerant according to the present disclosure preferably comprises HFO-1132a and R32 in a total amount of 99.5 mass % or more, more preferably 99.75 mass % or more, and still more preferably 99.9 mass % or more, based on the entire refrigerant.

Refrigerant 2 according to the present disclosure may further comprise other additional refrigerants in addition to HFO-1132(E), HFO-1132(E), and R32 as long as the above properties and effects are not impaired. In this respect, the refrigerant according to the present disclosure preferably comprises HFO-1132a, HFO-1132(E), and R32 in a total amount of 99.5 mass % or more, more preferably 99.75 mass % or more, and still more preferably 99.9 mass % or more, based on the entire refrigerant.

Additional refrigerants are not particularly limited and can be widely selected. The mixed refrigerant may contain one additional refrigerant, or two or more additional refrigerants.

1.2. Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer. FC-14 (tetrafluoromethane, $CF_4$), HCC-40 (chloromethane, $CH_3Cl$), HFC-23 (trifluoromethane, $CHF_3$), HFC-41 (fluoromethane, $CH_3Cl$), HFC-125 (pentafluoroethane, $CF_3CHF_2$), HFC-134a (1,1,1,2-tetrafluoroethane, $CF_3CH_2F$), HFC-134 (1,1,2,2-tetrafluoroethane, $CHF_2CHF_2$), HFC-143a (1,1,1-trifluoroethane, $CF_3CH_3$), HFC-143 (1,1,2-trifluoroethane, $CHF_2CH_2F$), HFC-152a (1,1-difluoroethane, $CHF_2CH_3$), HFC-152 (1,2-difluoroethane, $CH_2FCH_2F$), HFC-161 (fluoroethane, $CH_3CH_2F$), HFC-245fa (1,1,1,3,3-pentafluoropropane, $CF_3CH_2CHF_2$), HFC-236fa (1,1,1,3, 3,3-hexafluoropropane, $CF_3CH_2CF_3$), HFC-236ea (1,1,1,2,3,3-hexafluoropropane, $CF_3CHFCHF_2$), HFC-227ea (1,1,1,2,3,3,3-heptafluoropropane, $CF_3CHFCF_3$), HCFC-22 (chlorodifluoromethane, $CHClF_2$), HCFC-31 (chlorofluoromethane, $CH_2ClF$), CFC-1113 (chlorotrifluoroethylene, $CF_2\!\!=\!\!CClF$), HFE-125 (trifluoromethyl-difluoromethyl ether, $CF_3OCHF_2$), HFE-134a (trifluoromethyl-fluoromethyl ether, $CF_3OCH_2F$), HFE-143a (trifluoromethyl-methyl ether, $CF_3OCH_3$), HFE-227ea (trifluoromethyl-tetrafluoroethyl ether, $CF_3OCHFCF_3$), HFE-236fa (trifluoromethyl-trifluoroethyl ether, $CF_3OCH_2CF_3$), The refrigerant composition according to the present disclosure may contain one or more tracers at a total concentration of about 10 parts per million by weight (ppm) to about 1000 ppm based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1. Refrigeration Oil

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating the refrigerant according to the present disclosure in a refrigerating machine.

The embodiments are described above; however, it will be understood that various changes in forms and details can be made without departing from the spirit and scope of the claims.

Item 1. A composition comprising a refrigerant, the refrigerant comprising 1,1-difluoroethylene (HFO-1132a) and difluoromethane (R32), wherein HFO-1132a is present in an amount of 26 to 40 mass % based on the total of HFO-1132a and R32, and R32 is present in an amount of 60 to 74 mass % based on the total of HFO-1132a and R32.

Item 2. A composition comprising a refrigerant, the refrigerant comprising HFO-1132a, trans-1,2-difluoroethylene (HFO-1132(E)), and R32, wherein HFO-1132a and HFO-1132(E) are present in a total amount of 26 to 40 mass % based on the total of HFO-1132a, HFO-1132(E), and R32, and R32 is present in an amount of 60 to 74 mass % based on the total of HFO-1132a, HFO-1132(E), and R32.

Item 3. The composition according to Item 2, wherein HFO-1132a is present in an amount of 3 mass % or more based on the total of HFO-1132a, HFO-1132(E), and R32.

Item 4. The composition according to any one of Items 1 to 3, for use as a working fluid for a refrigerating machine, wherein the composition further comprises a refrigeration oil.

Item 5. The composition according to any one of Items 1 to 4, for use as an alternative refrigerant for R410A.

Item 6. Use of the composition according to any one of Items 1 to 4 as an alternative refrigerant for R410A.

Item 7. A refrigerating machine comprising the composition according to any one of Items 1 to 4 as a working fluid.

Item 8. A method for operating a refrigerating machine, comprising circulating the composition according to any one of Items 1 to 4 as a working fluid in a refrigerating machine.

EXAMPLES

The present disclosure is described in more detail below with reference to Examples. However, the present disclosure is not limited to the Examples.

Mixed refrigerants were prepared by mixing HFO-1132a, HFO-1132(E), and R32 at mass % based on their sum shown in Tables 1 to 3.

The GWP of R410A (R32=50%/R125=50%) and the mixed refrigerants was evaluated based on the values stated in the Intergovernmental Panel on Climate Change (IPCC), fourth report. The GWP of HFO-1132a, which was not stated in the report, was assumed to be 1 from HFO-1132a (GWP=1 or less) and HFO-1132(E) (GWP=0.3, described in PTL 1). The refrigerating capacity of R410A and the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity ratio of the mixed refrigerants relative to those of R410A were determined. The calculation conditions were as follows.

Evaporating temperature: 5° C.
Condensation temperature: 45° C.
Degree of superheating: 5 K
Degree of subcooling: 5 K
Compressor efficiency: 70%

Tables 1 to 3 show these values together with the GWP of each mixed refrigerant. The COP and refrigerating capacity are ratios relative to R410A.

The coefficient of performance (COP) was calculated according to the following equation.

$$COP = \text{(refrigerating capacity or heating capacity)} / \text{amount of electrical power consumed}$$

Tables 1 to 3 show the results.

The results of Table 1 indicate that the refrigerants comprising HFO-1132a in an amount of 26 to 40 mass % based on the total of HFO-1132a and R32, and R32 in an amount of 60 to 74 mass % based on the total of HFO-1132a and R32 have both a COP ratio and a refrigerating capacity ratio of 90% or more relative to those of R410A, and a GWP of 500 or less.

Further, the results of Tables 2 and 3 indicate that the refrigerants comprising HFO-1132a, HFO-1132(E), and R32, wherein HFO-1132a and HFO-1132(E) are present in a total amount of 26 to 40 mass % based on the total of HFO-1132(E), HFO-1132(E), and R32, and R32 is present in an amount of 60 to 74 mass % based on the total of HFO-1132a, HFO-1132(E), and R32, have a COP ratio of 90% or more relative to that of R410A, a refrigerating capacity ratio of 115% or more relative to that of R410A, and a GWP of 500 or less.

The invention claimed is:

1. A composition comprising a refrigerant, the refrigerant comprising 1,1-difluoroethylene (HFO-1132a), trans-1,2-difluoroethylene (HFO-1132(E)), and difluoromethane (R32) in a total amount of 99.5 mass % or more based on the entire refrigerant, wherein HFO-1132a and HFO-1132(E) are present in a total amount of 26 to 40 mass % based on the total of HFO-1132a, HFO-1132(E), and R32, and R32 is present in an amount of 60 to 74 mass % based on the total of HFO-1132a, HFO-1132(E), and R32, and wherein HFO-1132a is present in an amount of 3 mass % or more based on the total of HFO-1132a, HFO-1132(E) and R32.

TABLE 1

| Item | | Com Ex1 | Com Ex2 | Com Ex3 | Example1 | Example2 | Example3 | Com Ex4 | Com Ex5 |
|---|---|---|---|---|---|---|---|---|---|
| HFO-1132a | mass % | R410A | 0.0 | 20.0 | 26.0 | 30.0 | 40.0 | 50.0 | 60.0 |
| R32 | mass % | | 100.0 | 80.0 | 74.0 | 70.0 | 60.0 | 50.0 | 40.0 |
| GWP | — | | 2088 | 675 | 540 | 500 | 473 | 405 | 338 | 271 |
| COPc ratio | % (relative to R410A) | 100 | 102 | 97 | 95 | 93 | 90 | 85 | 79 |
| Refrigerating capacity ratio | % (relative to R410A) | 100 | 110 | 127 | 131 | 133 | 139 | 142 | 143 |
| Condensation glide | K | 0.1 | 0.0 | 4.3 | 4.6 | 4.6 | 4.0 | 2.9 | 1.5 |

TABLE 2

| Item | | Com Ex1 | Example1 | Example4 | Example5 | Example6 | Example7 | Com Ex6 | Com Ex7 |
|---|---|---|---|---|---|---|---|---|---|
| HFO-1132a | mass % | R410A | 26.0 | 20.0 | 13.0 | 6.0 | 3.0 | 1.0 | 0.0 |
| HFO-1132 (E) | mass % | | 0.0 | 6.0 | 13.0 | 20.0 | 23.0 | 25.0 | 26.0 |
| R32 | mass % | | 74.0 | 74.0 | 74.0 | 74.0 | 74.0 | 74.0 | 74.0 |
| GWP | — | 2088 | 500 | 500 | 500 | 500 | 500 | 500 | 500 |
| COPc ratio | % (relative to R410A) | 100 | 95 | 96 | 97 | 99 | 100 | 100 | 100 |
| Refrigerating capacity ratio | % (relative to R410A) | 100 | 131 | 128 | 123 | 118 | 115 | 114 | 113 |
| Condensation glide | K | 0.1 | 5.6 | 4.8 | 3.6 | 1.9 | 1.1 | 0.5 | 0.2 |

TABLE 3

| Item | | Com Ex1 | Example3 | Example8 | Example9 | Example10 | Com Ex8 | Com Ex9 |
|---|---|---|---|---|---|---|---|---|
| HFO-1132a | mass % | R410A | 40.0 | 20.0 | 10.0 | 3.0 | 1.0 | 0.0 |
| HFO-1132 (E) | mass % | | 0.0 | 20.0 | 30.0 | 37.0 | 39.0 | 40.0 |
| R32 | mass % | | 60.0 | 60.0 | 60.0 | 60.0 | 60.0 | 60.0 |
| GWP | — | 2088 | 405 | 405 | 405 | 405 | 405 | 405 |
| COPc ratio | % (relative to R410A) | 100 | 90 | 94 | 97 | 99 | 99 | 100 |
| Refrigerating capacity ratio | % (relative to R410A) | 100 | 139 | 129 | 122 | 115 | 114 | 113 |
| Condensation glide | K | 0.1 | 4.0 | 3.9 | 2.7 | 1.0 | 0.4 | 0.0 |

2. The composition according to claim 1, for use as a working fluid for a refrigerating machine, wherein the composition further comprises a refrigeration oil.

3. The composition according to claim 1, for use as an alternative refrigerant for R410A.

4. A method for operating a refrigerating machine, comprising circulating the composition according to claim 1 in a refrigerating machine designed for R410A.

5. A method for operating a refrigerating machine, comprising circulating the composition according to claim 1 as a working fluid in a refrigerating machine.

6. A refrigerating machine comprising the composition according to claim 1 as a working fluid.

* * * * *